July 7, 1931. W. J. TELL 1,812,907
DEVICE FOR TAPPING PIPES
Filed Jan. 13, 1930

INVENTOR
William J. Tell.
BY
Harness, Dickey, Pierce & Hann
ATTORNEYS.

Patented July 7, 1931

1,812,907

UNITED STATES PATENT OFFICE

WILLIAM J. TELL, OF DETROIT, MICHIGAN

DEVICE FOR TAPPING PIPES

Application filed January 13, 1930. Serial No. 420,344.

This invention relates to means for installing the water connections for humidifiers and the like.

The main objects of this invention are to provide an improved device for tapping a water pipe; to provide a device which is simple in construction and efficient in operation; to provide in such a device a combined drill and plug for the hole drilled which will make a water-tight seal with the pipe without the aid of gaskets or other perishable parts, and to provide a device of this character which can be applied to a water pipe without the use of special tools.

An illustrative embodiment of this invention is shown in the accompanying drawings, in which Fig. 1 is a fragmentary top plan view of my improved device installed on a water pipe and humidifier.

Figure 1:
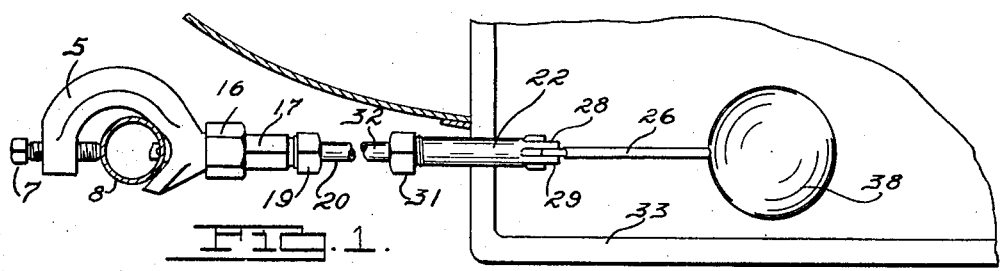
Figure 2:
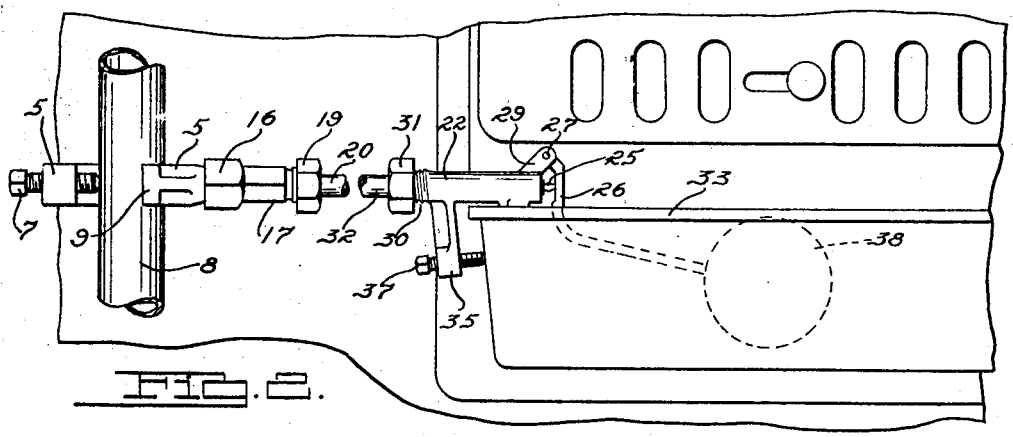
Fig. 2 is a view in side elevation of the same.
Figure 3:
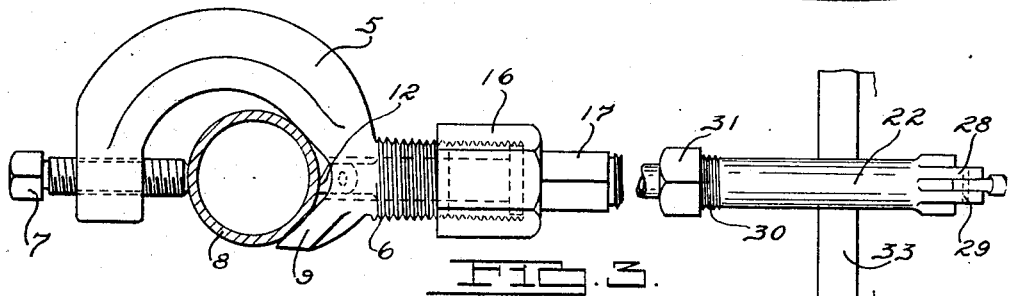
Fig. 3 is an enlarged plan view showing the drill in initial position before boring through the pipe.
Figure 4:
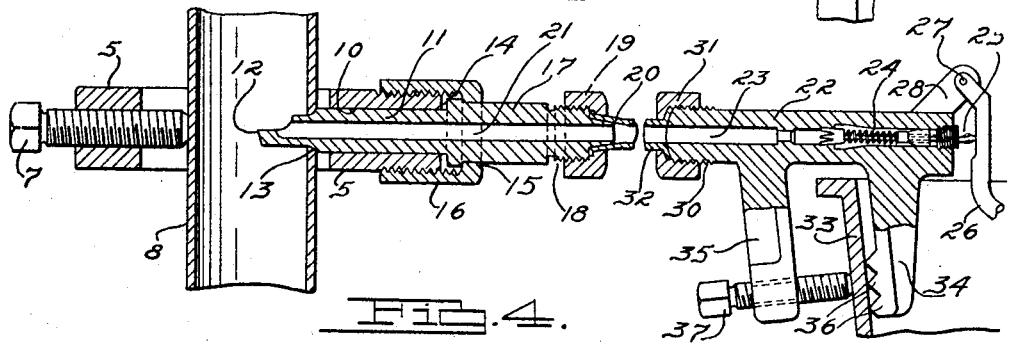
Fig. 4 is a longitudinal sectional view of the same taken on a plane perpendicular to the plane of the figure shown in Fig. 3 and with the drill in final position.

Heretofore in the construction of devices used for tapping water pipes, it has been necessary to provide gaskets and the like for securing a water-tight connection after the pipe has been drilled into. These constructions have been found unsatisfactory due to the perishability of the gaskets and subsequent leakage, and also by reason of the relatively high cost of devices having a multiplicity of parts.

In my present construction, I provide a tubular drill which may be operated without the use of special tools, and which is rotatably and axially movable in a clamp which may be readily secured to a water pipe. Means are provided for feeding the drill into the pipe at the same time that the drill is rotated. When the pipe has been drilled through, the drill is further advanced, and by reason of its outside graduated diameter, will effectually plug the hole which has been drilled into the pipe, without the aid of gaskets or other perishable parts.

In the construction shown in the drawings, a yoke clamp 5 having an exteriorly threaded shank 6 is provided with a set screw 7 threaded therethrough at the side of the clamp which is diametrically opposite to the shank 6. The clamp 5 is adapted to embrace a water pipe 8 and be securely held thereon by the set screw 7. That portion of the clamp adjacent the shank 6 is provided with an integrally formed finger 9 which cooperates with the main body of the clamp for embracing the pipe 8.

The clamp 5 and shank 6 have a bore 10 extending therethrough, which is in axial alignment with the set screw 7, and which is adapted to rotatably receive a tubular drill 11. The drill 11 is both rotatably and axially movable within the bore 10, and the inner end thereof is provided with a cutting face 12. Means are provided for effectually sealing the hole made by the cutting end 12 of the drill 11, and comprises a shoulder 13 of graduated outside diameter, formed adjacent the cutting end 12 of the drill 11. In the form shown, this shoulder is radiused, but a tapered shoulder would serve the same purpose.

The drill 11 is provided with a radially extending annular shoulder 14 which is adapted to be engaged by the inturned annular flange 15 of an interiorly threaded sleeve 16. The sleeve 16 is adapted to thread on the exteriorly threaded shank 6, thus providing means for feeding the tubular drill inwardly toward the pipe 8, while permitting it to be rotated due to the swivel connection formed by the shoulder 14 and inturned flange 15.

That portion of the drill 11 outward from the shoulder 14 is preferably of squared outside formation, as shown at 17, so that a wrench may be applied thereto for rotating the drill during the drilling operation. The extreme outer end of the drill beyond the squared portion 17 is exteriorly threaded, as shown at 18, for receiving an interiorly threaded coupling nut 19 which secures the outwardly flared end of a fluid supply pipe 20 thereto. The pipe 20 supplies water to the bore 21 which extends axially through the drill 11.

I have shown and described my invention as applied to means for automatically maintaining a predetermined water level in a humidifier, which comprises an elongated horizontally disposed body member 22 which has a longitudinally extending bore 23 drilled therethrough. The inner end of the bore 23 is provided with a valve assembly, generally designated at 24, which is preferably the well-known type of air valve used in the valve stems of pneumatic tire tubes. The valve stem 25 of this valve assembly protrudes beyond the inner end of the body 22, and is in position to be engaged and actuated by a flat arm 26 pivotally mounted at 27 between a pair of upstanding arms 28 and 29 integrally formed on the top side of the body 22 closely adjacent the inner end thereof. The opposite or outer end of the body 22 is exteriorly threaded as shown at 30 to receive an interiorly threaded nut 31 which clamps the outwardly flared end of a water supply pipe 32 against the outer face of said threaded end.

Means are provided for securing the body 22 to a humidifier 33, and comprises a pair of spaced depending legs 34 and 35 integrally formed on the body 22, and which are adapted to embrace opposite sides of the upstanding rim of the humidifier. The inner face of the leg 34 is provided with a plurality of serrations or teeth 36 which are adapted to bite into and securely hold the device when clamped in contact with the inner wall of the humidifier. A set screw 37 is threaded through the lower end of the arm 35 in position to engage the outer surface of the humidifier 33 in a position directly opposite to the teeth 36.

The float arm 26 is provided with the usual hollow ball float 38, which swings the arm 26 in a vertical plane.

In the operation of this device, the clamp yoke 5 is placed around a water supply pipe 8 and the set screw 7 turned until the clamp is securely in position on the pipe. The tubular drill 11 is then inserted into the bore 10 and the sleeve 16 threaded on to the shank 6 until the inturned flange 15 engages the shoulder 14 of the drill and presses the cutting end 12 of the drill against the pipe. A wrench is applied to the sleeve 16, which may be of hexagonal exterior shape, and another wrench applied to the squared portion 17 of the drill. The drill is now rotated by the wrench on the squared portion thereof, and at the same time is fed or moved axially toward the pipe 8 by gradually screwing up the sleeve 16. When the drill has bored its way through the wall of the pipe 8 the sleeve 16 is screwed on down on the shank 6 until the graduated shoulder 13 adjacent the inner end of the drill enters the hole which has been bored through the pipe, and wedges tightly therein, thus securing an effectually water tight seal with the pipe without the aid of gaskets.

It will be noted that the end of the drill bore 21 which communicates with the interior of the pipe 8, is of smaller size than the remainder of the bore, so that any of the particles of metal drilled from the pipe 8 which may get into the bore 21, will be readily flushed out. If any of the particles of drilling should become wedged in the inner end of this bore, they may be readily dislodged by inserting a piece of wire through the tubular drill.

The body 22 which carries the valve assembly and float control mechanism is attached to the upstanding rim of the humidifier 33 by the set screw 37, and the two devices may be readily placed in communication with each other by suitable pipes 32, or a single pipe may be used to couple these devices together. Annealed copper tubing is very suitable for this purpose, as the ends thereof may be secured by clamping nuts 19 and 31 so as to make a water tight connection without threading the ends.

Although but one specific embodiment of this invention has been herein shown and described, it will be understood that numerous details of the construction shown may be altered or omitted without departing from the spirit of this invention as defined by the following claims.

I claim:—

1. The combination of a clamp adapted to embrace a pipe, a drill member journaled on said clamp and axially movable with respect thereto, a member having a swivel engagement with said drill and threaded engagement with said clamp for axially moving said drill, said drill having a bore therethrough and a portion of graduated outside diameter adjacent the cutting end thereof for sealing the hole made by said drill when plugged thereinto.

2. The combination of a yoke clamp adapted to embrace a pipe, an exteriorly threaded shank on said clamp, said clamp and shank having a bore extending therethrough, a set screw threaded in said clamp at the side thereof diametrically opposite to said bore, a tubular drill rotatable and axially slidable in said bore, a sleeve threaded on said shank having swivel engagement with said drill for feeding said drill to the pipe embraced by said clamp, the outer surface adjacent the cutting end of said drill being of graduated diameter for sealing the hole made by said drill when plugged thereinto.

3. The combination of a yoke clamp adapted to embrace a pipe, an exteriorly threaded shank on said clamp, said clamp and shank having a bore extending therethrough, a set screw threaded in said clamp at the side thereof diametrically opposite to said bore, a tubular drill rotatable and axially slidable in said bore, a circumferentially extending annular shoulder on said drill, a sleeve threaded on said shank, an inturned annular flange on said sleeve swivelly engaging said drill shoulder for moving said drill axially, the outer surface adjacent the outer end of said drill being of graduated diameter for sealing the hole made by said drill when plugged thereinto.

WILLIAM J. TELL.